United States Patent
Kato et al.

(10) Patent No.: US 7,620,421 B2
(45) Date of Patent: Nov. 17, 2009

(54) ANTENNA APPARATUS ENABLING EASY RECEPTION OF A SATELLITE SIGNAL AND A MOBILE OBJECT EQUIPPED WITH THE ANTENNA APPARATUS

(75) Inventors: Takao Kato, Akita (JP); Junichi Noro, Akita (JP); Akira Miyoshi, Tokyo (JP); Toshiaki Aizawa, Akita (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 485 days.

(21) Appl. No.: 11/024,607

(22) Filed: Dec. 29, 2004

(65) Prior Publication Data

US 2005/0192057 A1    Sep. 1, 2005

(30) Foreign Application Priority Data

Feb. 27, 2004    (JP) ............................. 2004-052953

(51) Int. Cl.
*H04M 1/00*    (2006.01)
(52) U.S. Cl. .................. 455/562.1; 455/575.7; 455/121; 455/274; 455/345; 343/728; 343/729; 343/700 MS; 343/742; 343/867
(58) Field of Classification Search .............. 455/562.1, 455/575.5, 575.7, 121, 129, 274, 7, 11.1, 455/345, 90.3, 3.02, 277.1, 300, 301, 83; 343/725, 728, 729, 700 MS, 742, 867, 702, 343/713; 380/236
See application file for complete search history.

(56) References Cited

U.S. PATENT DOCUMENTS

| | | | |
|---|---|---|---|
| 5,300,936 A * | 4/1994 | Izadian ................ | 343/700 MS |
| 6,272,328 B1 * | 8/2001 | Nguyen et al. ........... | 455/277.1 |
| 6,384,786 B2 * | 5/2002 | Ito et al. ............... | 343/700 MS |
| 6,493,546 B2 * | 12/2002 | Patsiokas ................ | 455/277.1 |
| 6,606,060 B2 | 8/2003 | Park | |
| 6,700,543 B2 | 3/2004 | Konishi et al. | |
| 6,809,686 B2 * | 10/2004 | Du et al. ............... | 343/700 MS |
| 6,810,233 B2 * | 10/2004 | Patsiokas .................. | 455/3.02 |
| 6,891,508 B2 | 5/2005 | Inoue | |
| 6,927,737 B2 | 8/2005 | Inoue | |
| 6,950,072 B2 * | 9/2005 | Miyata et al. ............ | 343/702 |
| 6,950,626 B2 * | 9/2005 | Suenaga ................. | 455/41.2 |
| 6,990,334 B1 | 1/2006 | Ito | |
| 6,999,032 B2 * | 2/2006 | Pakray et al. ............. | 343/713 |

(Continued)

FOREIGN PATENT DOCUMENTS

JP    63-187926 A    8/1988

(Continued)

*Primary Examiner*—Edward Urban
*Assistant Examiner*—Junpeng Chen
(74) *Attorney, Agent, or Firm*—Frishauf, Holtz, Goodman & Chick, P.C.

(57) ABSTRACT

In addition to an FM reception antenna element for receiving an FM radio wave and an FM receiver connected to the FM reception antenna element, a mobile object is provided with a first antenna element for receiving a satellite signal, a signal processing unit connected to the first antenna, and a second antenna element connected to the signal processing unit. The signal processing unit processes the satellite signal into an FM signal. The second antenna element emits the FM signal as the FM radio wave that may be received in the FM reception antenna and processed by the FM receiver in the manner known in the art.

20 Claims, 3 Drawing Sheets

U.S. PATENT DOCUMENTS

| | | |
|---|---|---|
| 7,002,523 B2 * | 2/2006 | Noro .......................... 343/713 |
| 7,042,399 B2 * | 5/2006 | Noro et al. ............ 343/700 MS |
| 7,260,882 B2 * | 8/2007 | Credelle et al. ................ 29/600 |
| 2001/0008384 A1 * | 7/2001 | Ku ................................ 331/2 |
| 2002/0018021 A1 * | 2/2002 | Koyanagi et al. ............ 343/702 |
| 2002/0075190 A1 * | 6/2002 | Ghosh et al. ................ 343/702 |
| 2003/0034857 A1 * | 2/2003 | Chen .......................... 333/132 |
| 2003/0058173 A1 * | 3/2003 | Yoon .......................... 343/702 |
| 2003/0099356 A1 * | 5/2003 | Fujino et al. ................ 380/236 |
| 2003/0231137 A1 * | 12/2003 | Du et al. .................... 343/713 |
| 2004/0004571 A1 * | 1/2004 | Adachi et al. ......... 343/700 MS |
| 2005/0040997 A1 * | 2/2005 | Akiho et al. ................. 343/866 |
| 2006/0109183 A1 * | 5/2006 | Rosenberg et al. .......... 343/702 |

FOREIGN PATENT DOCUMENTS

| | | |
|---|---|---|
| JP | 6-104624 A | 4/1994 |
| JP | 6-132714 A | 5/1994 |
| JP | 9-98006 A | 4/1997 |
| JP | 11-68685 A | 3/1999 |
| JP | 2001-251136 A | 9/2001 |
| JP | 2002-236894 A | 8/2002 |
| JP | 2002-374115 A | 12/2002 |
| JP | 2003-032024 A | 1/2003 |
| JP | 2003-087044 A | 3/2003 |
| JP | 2003-152445 A | 5/2003 |
| JP | 2003-163531 A | 6/2003 |

* cited by examiner

ANTENNA APPARATUS ENABLING EASY RECEPTION OF A SATELLITE SIGNAL AND A MOBILE OBJECT EQUIPPED WITH THE ANTENNA APPARATUS

This application claims priority to prior Japanese patent application JP 2004-52953, the disclosure of which is incorporated herein by reference.

BACKGROUND OF THE INVENTION

This invention relates to an antenna apparatus and, in particular, to an antenna apparatus for use in reception of a radio signal from an artificial satellite, i.e., a satellite signal.

In recent years, a digital radio receiver adapted to receive a satellite signal has been developed and is put into practical use in United States of America. The digital radio receiver is mounted on a mobile object such as an automobile and is adapted to receive a radio wave having a frequency of about 2.3 GHz as a reception radio wave. In other words, the digital radio receiver is a radio receiver capable of listening to mobile broadcasting. Since the reception radio wave has a frequency of about 2.3 GHz, a reception wavelength (resonance wavelength) λ is equal to about 128.3 mm. It is noted here that the satellite signal is not only transmitted as a satellite wave but also as a ground wave derived from the satellite wave. The ground wave is obtained by slightly shifting the frequency of the satellite wave after the satellite wave is received by a ground station and is retransmitted with linear polarization.

Since the satellite signal is transmitted by the use of the radio wave having the frequency of about 2.3 GHz, an antenna for receiving the satellite signal must be located outdoors. In case where the digital radio receiver is mounted to the automobile, the antenna is generally attached to a roof of the automobile. On the other hand, a reception apparatus such as a receiver is disposed inside the automobile and connected to the antenna through a lead wire.

Typically, the automobile is equipped with an FM receiver for receiving a radio signal in an FM band. Therefore, in order to receive the satellite signal, an independent digital radio receiver must be equipped in addition to the FM receiver. Further, in some cases, an additional loudspeaker will be required to be installed. Therefore, reception facilities mounted to the automobile as a whole are complicated, resulting in an increase in cost.

SUMMARY OF THE INVENTION

It is therefore an object of this invention to provide an antenna apparatus which enables reception of a satellite signal with a simple structure.

It is another object of the present invention to provide an antenna apparatus which enables reception of a satellite signal by the use of an FM receiver.

It is still another object of the present invention to provide a mobile object having simple reception facilities capable of receiving both an FM radio wave and a satellite signal.

Other objects of the present invention will become clear as the description proceeds.

According to an aspect of the present invention, there is provided a complex antenna apparatus which comprises a first antenna element for receiving a satellite signal, a receiving circuit connected to the first antenna element for producing a reception signal in response to the satellite signal, a transmitting circuit for producing an FM signal in response to a transmission signal produced in response to the reception signal, and a second antenna element connected to the transmitting circuit for emitting an FM radio wave in response to the FM signal.

According to another aspect of the present invention, there is provided a mobile object which comprises an FM reception antenna element for receiving an FM radio wave, an FM receiver connected to the FM reception antenna element, a first antenna element for receiving a satellite signal, a signal processing unit connected to the first antenna element for processing the satellite signal into an FM signal, and a second antenna element connected to the signal processing unit for emitting the FM signal as the FM radio wave that may be received in the FM reception antenna element.

DESCRIPTION OF THE PREFERRED EMBODIMENT

Figure 1:
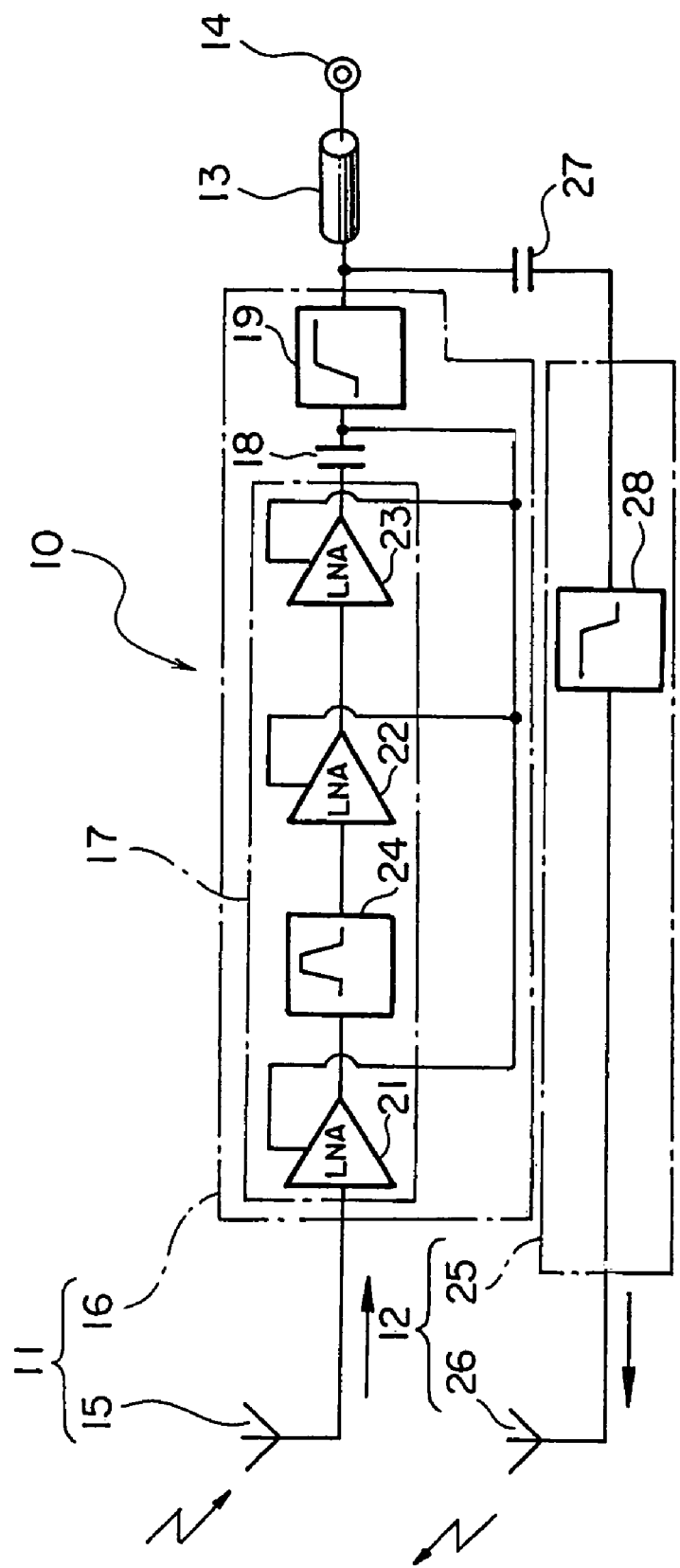
FIG. 1 is a block diagram of a complex antenna apparatus according to one embodiment of this invention.

Referring to FIG. 1, description will be made of a complex antenna apparatus according to one embodiment of this invention.

The complex antenna apparatus illustrated in the figure is depicted by a reference numeral 10 as a whole and includes a receiving system 11 and a transmitting system 12. Each of the receiving and the transmitting systems 11 and 12 is connected through a cable 13 to a signal conversion unit 14 whose function will later become clear.

The receiving system 11 comprises a first antenna element 15 as a satellite radio band reception antenna for receiving a satellite signal, and a receiving circuit 16 connected to the first antenna element 11 for producing a reception signal in response to the satellite signal. The first antenna element 15 is adapted to receive a radio wave having a frequency of about 2.3 GHz as the satellite signal. The receiving circuit 16 comprises a low noise amplifier (LNA) circuit 17 connected to the first antenna element 15, and a high-pass filter 19 connected to the low noise amplifier circuit 17 through a capacitor 18 for producing the reception signal. The low noise amplifier circuit 17 comprises first, second, and third LNAs 21, 22, and 23 connected in series, and a band-pass filter 24 inserted between the first and the second LNAs 21 and 22.

The high-pass filter 19 produces the reception signal having a relatively high frequency and sends the reception signal through the cable 13 to the signal conversion unit 14. In response to the reception signal, the signal conversion unit 14 produces a transmission signal having a relatively low frequency. The transmission signal is supplied to the transmitting system 12.

The transmitting system 12 comprises a transmitting circuit 25 for producing an FM signal in response to the transmission signal, and a second antenna element 26 as an FM band emission antenna connected to the transmitting circuit 25 for transmitting or emitting the FM signal. The transmitting circuit 25 has a low-pass filter 28 connected through a capacitor 27 to the signal conversion unit 14. The low-pass filter 28 produces the FM signal in response to the transmission signal. The second antenna element 26 is connected to the low-pass filter 28 and transmits or emits the FM signal as an FM band radio wave.

Thus, in the complex antenna apparatus 10 illustrated in FIG. 1, the first antenna element 15 receives the radio wave having a frequency of about 2.3 GHz, such as the satellite signal, and the second antenna element 26 transmits or emits the FM band radio wave corresponding thereto. Herein, a combination of the receiving system 11, the transmitting system 12, and the signal conversion unit 14 serves as a signal processing unit for processing the satellite signal into the FM signal.

Figure 2:
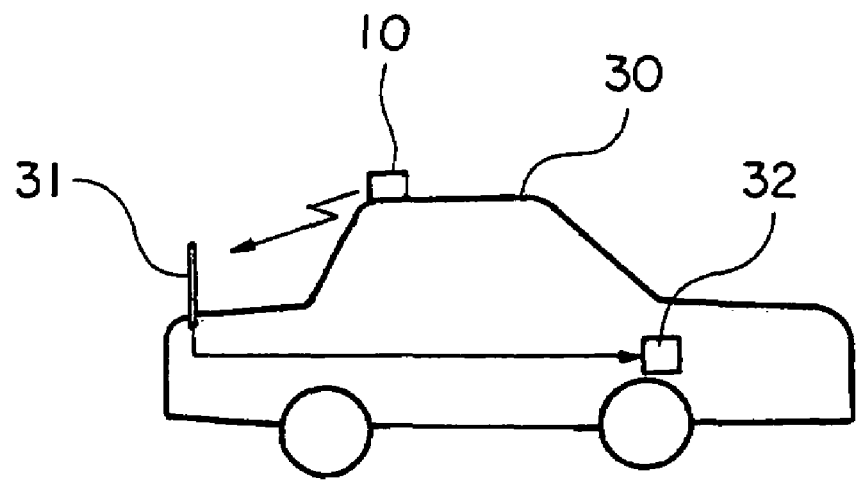
FIG. 2 is a schematic diagram of an automobile equipped with the complex antenna apparatus illustrated in FIG. 1.

Referring to FIG. 2 in addition to FIG. 1, description will be made of the case where the complex antenna apparatus in FIG. 1 is mounted to a mobile object such as an automobile.

An automobile 30 illustrated in the figure has an FM reception antenna element 31 for receiving an FM band radio wave such as typical FM broadcasting, an FM receiver 32 connected to the FM reception antenna element 31, and a loudspeaker (not shown) connected to the FM receiver 32. With this structure, it is possible to receive and reproduce the FM signal. Therefore, it is possible to listen to the typical FM broadcasting inside the automobile 30.

Further, the above-mentioned complex antenna apparatus 10 is mounted on an outer surface of a roof of the automobile 30. As the signal conversion unit 14 described above, a known receiving unit included in the FM receiver 32 may be used.

When the first antenna element 15 receives the satellite signal, the second antenna element 26 transmits or emits the FM band radio wave corresponding thereto. The FM band radio wave is received by the FM reception antenna element 31 and sent to the FM receiver 32. Therefore, the satellite signal is also processed by the FM receiver 32, like the typical FM broadcasting. Thus by the use of the FM receiver 32, the satellite signal can be received with a simple structure.

As a consequence, it is possible to listen to not only the typical FM broadcasting but also satellite-based broadcasting inside the automobile. In this case, the satellite signal is converted into the FM band radio wave corresponding to the satellite signal so as to be received by reception facilities for the typical FM broadcasting. Therefore, it is possible to prevent the reception facilities as a whole from being complicated and to avoid an increase in cost. Thus, both of the FM signal and the satellite signal can be received with simple reception facilities.

Figure 3:
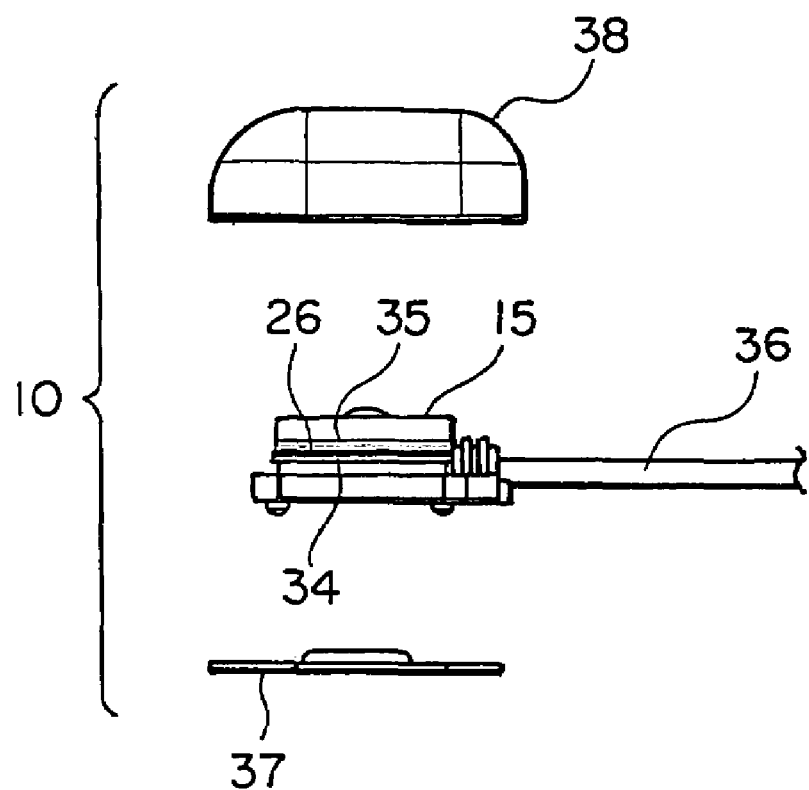
FIG. 3 is an exploded view of an example of the complex antenna apparatus illustrated in FIG. 1.

Referring to FIG. 3 in addition, description will be made of an example of a structure of the complex antenna apparatus 10.

The complex antenna apparatus 10 illustrated in the figure comprises a substrate 34 with the receiving circuit 16 and the transmitting circuit 25 mounted thereto, and an antenna base 35 mechanically coupled to an upper surface of the substrate 34. The first antenna element 15 is disposed on an upper surface of the antenna base 35. A combination of the antenna base 35 and the first antenna element 15 mounted on its upper surface may be called a patch antenna.

The second antenna element 26 is disposed on side surfaces of the antenna base 35. A cable 36 is extracted from the substrate 34. The substrate 34 may be equipped with the low noise amplifier circuit 17 alone. In this case, the substrate 34 may be called a LNA circuit board.

The complex antenna apparatus 10 further comprises a bottom plate 37 on which the substrate 34 is placed, and a top cover 38 coupled to the bottom plate 37 and surrounding the substrate 34 and the antenna base 35 in cooperation with the bottom plate 37.

Figure 4:
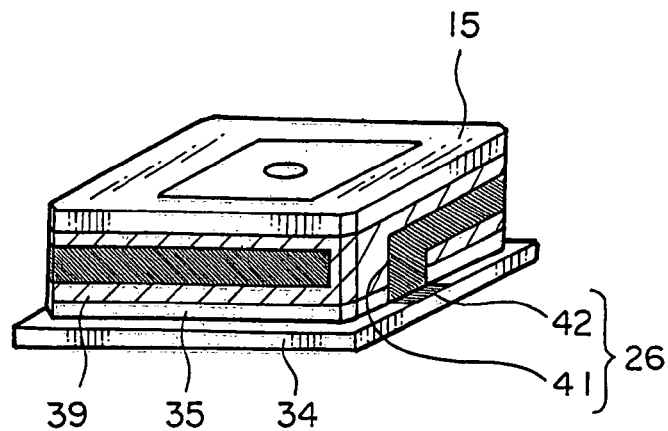
FIG. 4 is a perspective view of an internal structure of the complex antenna apparatus illustrated in FIG. 3.
Figure 5:
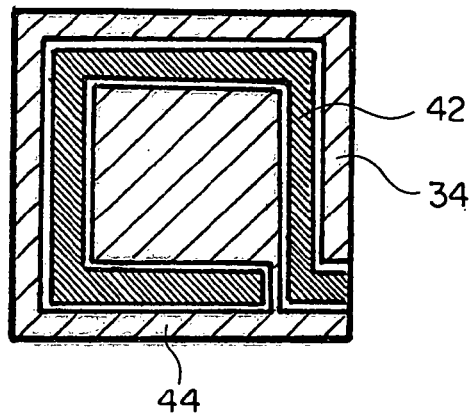
FIG. 5 is a plan view of a substrate used in the internal structure illustrated in FIG. 4.

Referring to FIGS. 4 and 5 in addition, description will be made of an internal structure of the complex antenna apparatus 10.

The first antenna element 15 is mechanically coupled to an axial one end, i.e., the upper surface of the antenna base 35. The first antenna element 15 may be implemented by a known antenna element and will not be described herein.

The second antenna element 26 includes a first conductor portion 41 comprising a copper tape adhered to the side surfaces of the antenna base 35 through a tape member 39, and a second conductor portion 42 formed on the substrate 34 and electrically connected in series to the first conductor portion 41. The first conductor portion 41 extends in a loop-like fashion along an axial peripheral surface of the antenna base 35, i.e., four side surfaces. The first conductor portion 41 may comprise a metal structure or a wire having elasticity.

The second conductor portion 42 is patterned on the upper surface of the substrate 34, together with a ground conductor 44. The second conductor portion 42 extends in a loop-like fashion along the upper surface of the substrate 34 and is electrically insulated from the ground conductor 44.

Since the second antenna element 26 comprises the first and the second conductor portions 41 and 42, it is easy to design the antenna increased in effective length.

Figure 6:
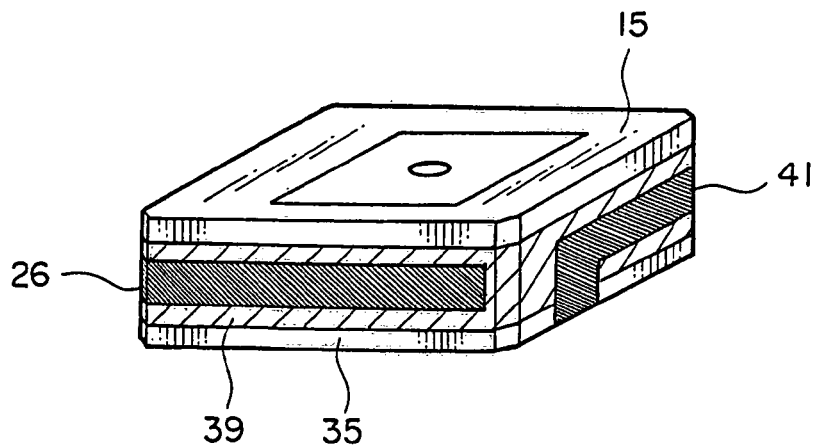
FIG. 6 is a perspective view of another example of the internal structure of the complex antenna apparatus.

As shown in FIG. 6, the second antenna element 26 may comprise only the first conductor portion 41 formed on the antenna base 35.

It is readily understood that the above-mentioned complex antenna apparatus may be mounted to any mobile object other than the automobile.

While the present invention has thus far been described in connection with the preferred embodiment thereof, it will readily be possible for those skilled in the art to put this invention into practice in various other manners.

What is claimed is:

1. A complex antenna apparatus comprising:
   a first antenna element for receiving a satellite signal;
   a receiving circuit connected to the first antenna element for producing a reception signal in response to the satellite signal;
   a transmitting circuit for producing an FM signal in response to a transmission signal produced in response to the reception signal;
   a second antenna element connected to the transmitting circuit for emitting an FM radio wave in response to the FM signal, the second antenna element being separated from the first antenna element;
   an antenna base having an upper surface and a side surface adjacent to the upper surface; and
   a substrate having the antenna base mounted thereon;
   wherein the first antenna element is mechanically coupled to only the upper surface of the antenna base, and
   wherein the second antenna element comprises:
   a first conductor portion which extends along only the side surface of the antenna base in a loop shape; and
   a second conductor portion which is formed on the substrate.

2. The complex antenna apparatus according to claim 1, further comprising a signal conversion unit connected to the receiving circuit and the transmitting circuit for producing the transmission signal in response to the reception signal to supply the transmission signal to the transmitting circuit.

3. The complex antenna apparatus according to claim 1, wherein the receiving circuit comprises:

a low noise amplifier circuit connected to the first antenna element; and
a high-pass filter connected to the low noise amplifier circuit for producing the reception signal; and
wherein the transmitting circuit comprises:
a low-pass filter connected to the second antenna element for producing the FM signal in response to the transmission signal.

4. The complex antenna apparatus according to claim 1, wherein the substrate has at least one of the receiving circuit and the transmitting circuit thereon; and
wherein the second conductor portion is patterned on the substrate so as to extend in a loop shape.

5. The complex antenna apparatus according to claim 4, wherein the antenna base is mechanically coupled to the substrate.

6. The complex antenna apparatus according to claim 4, wherein the second conductor portion is connected to the first conductor portion.

7. The complex antenna apparatus according to claim 4, wherein the substrate has a ground surface with a ground conductor provided thereon, and the second conductor portion is provided on the ground surface and electrically insulated from the ground conductor.

8. The complex antenna apparatus according to claim 4, further comprising:
a bottom plate on which the substrate is placed; and
a top cover coupled to the bottom plate and surrounding the substrate and the antenna base in cooperation with the bottom plate.

9. The complex antenna apparatus according to claim 4, wherein both the receiving circuit and the transmitting circuit are mounted on the substrate.

10. The complex antenna apparatus according to claim 1, wherein the second conductor portion extends between the substrate and the antenna base, and is connected to the first conductor portion.

11. A mobile object comprising:
an FM reception antenna element for receiving an FM radio wave;
an FM receiver connected to the FM reception antenna element;
a first antenna element for receiving a satellite signal;
a signal processing unit connected to the first antenna element for processing the satellite signal into an FM signal;
a second antenna element connected to the signal processing unit for emitting the FM signal as an FM radio wave that is receivable by the FM reception antenna element, the second antenna element being separated from the first antenna element;
an antenna base having an upper surface and a side surface adjacent to the upper surface; and
a substrate having the antenna base mounted thereon;
wherein the first antenna element is mechanically coupled to only the upper surface of the antenna base, and
wherein the second antenna element comprises:
a first conductor portion which extends along only the side surface of the antenna base in a loop shape; and
a second conductor portion which is formed on the substrate.

12. The mobile object according to claim 11 wherein the signal processing unit comprises:
a receiving circuit connected to the first antenna element for producing a reception signal in response to the satellite signal;
a signal conversion unit connected to the receiving circuit for producing a transmission signal in response to the reception signal; and
a transmitting circuit connected to the signal conversion unit and the second antenna element for producing the FM signal in response to the transmission signal.

13. The mobile object according to claim 12, wherein the receiving circuit comprises:
a low noise amplifier circuit connected to the first antenna element; and
a high-pass filter connected to the low noise amplifier circuit for producing the reception signal; and
wherein the transmitting circuit comprises:
a low-pass filter connected to the second antenna element for producing the FM signal in response to the transmission signal.

14. The mobile object according to claim 12, wherein the substrate has at least one of the receiving circuit and the transmitting circuit thereon, and
wherein the second conductor portion is patterned on the substrate so as to extend in a loop shape.

15. The mobile object according to claim 14, wherein the antenna base is mechanically coupled to the substrate.

16. The mobile object according to claim 14, wherein the second conductor portion is connected to the first conductor portion.

17. The mobile object according to claim 14, wherein the substrate has a ground surface with a ground conductor provided thereon, and the second conductor portion is provided on the ground surface and electrically insulated from the ground conductor.

18. The mobile object according to claim 14, further comprising:
a bottom plate on which the substrate is placed; and
a top cover coupled to the bottom plate and surrounding the substrate and the antenna base in cooperation with the bottom plate.

19. The mobile object according to claim 14, wherein both the receiving circuit and the transmitting circuit are mounted on the substrate.

20. The mobile object according to claim 11, wherein the second conductor portion extends between the substrate and the antenna base, and is connected to the first conductor portion.

* * * * *